United States Patent
Ford

(10) Patent No.: US 8,030,803 B1
(45) Date of Patent: Oct. 4, 2011

(54) DISPENSER DATA DISTRIBUTION SYSTEM WITH CONTROLLABLE DISCONNECTORS

(75) Inventor: James A. Ford, Greensboro, NC (US)

(73) Assignee: Power Integrity Corp., Greensboro, NC (US)

( * ) Notice: Subject to any disclaimer, the term of this patent is extended or adjusted under 35 U.S.C. 154(b) by 166 days.

(21) Appl. No.: 11/866,716

(22) Filed: Oct. 3, 2007

Related U.S. Application Data

(60) Provisional application No. 60/848,938, filed on Oct. 3, 2006.

(51) Int. Cl.
  *H02H 11/00* (2006.01)
  *H02H 7/00* (2006.01)
(52) U.S. Cl. .................................. 307/326; 361/2
(58) Field of Classification Search .................. 307/326; 361/2
  See application file for complete search history.

(56) References Cited

U.S. PATENT DOCUMENTS

| | | | | |
|---|---|---|---|---|
| 5,400,253 | A * | 3/1995 | O'Connor | 701/123 |
| 5,874,787 | A * | 2/1999 | Meyer et al. | 307/39 |
| 6,158,618 | A * | 12/2000 | Mercer | 222/25 |
| 6,342,998 | B1 * | 1/2002 | Bencivenga et al. | 361/107 |
| 6,808,087 | B1 * | 10/2004 | Ford | 222/144.5 |
| 7,016,741 | B2 * | 3/2006 | Arntson | 700/19 |
| 7,420,297 | B2 * | 9/2008 | Scharnick | 307/326 |

* cited by examiner

*Primary Examiner* — Michael Rutland Wallis
(74) *Attorney, Agent, or Firm* — MacCord Mason PLLC

(57) ABSTRACT

A petroleum dispensing system having a dispenser data distribution system with controllable disconnectors for improving on the conventional wiring that connects dispenser data circuits to the system's site controls. The system includes an emergency stop control system, emergency stop disconnects, data wiring terminals, a circuit for connecting and grouping data signals, and dispenser data disconnect and bypass means.

29 Claims, 4 Drawing Sheets

DISPENSER DATA DISTRIBUTION SYSTEM WITH CONTROLLABLE DISCONNECTORS

This application claims priority from provisional application No. 60/848,938, filed Oct. 3, 2006, which is hereby incorporated by reference in its entirety.

BACKGROUND OF THE INVENTION (1) Field of the Invention

The present invention relates generally to petroleum dispensing systems and, more particularly, to a dispenser data distribution system with controllable disconnectors for improving the conventional wiring connecting dispenser data circuits to the system's site controls and point of sale terminals.

(2) Description of the Prior Art

Service stations for delivering fuel to automobiles include a plurality of fuel dispensers that are typically stationed adjacent to a convenience store. Each fuel dispenser is made up of a housing, a regulator or pump to control the flow of fuel through the housing, a fuel flow meter in the housing, a display on the housing to display the amount of fuel pumped through the housing, and a fuel hose with nozzle having a manual dispenser control for delivering fuel into an automobile's fuel tank.

A dispenser data distribution system comprises low voltage communication circuitry that conducts data signals between the plurality of fuel dispensers and at least one point of sales terminal that is typically inside of the convenience store. While present day service stations do include emergency shutdown circuits for the line voltage that operates the dispenser pumps, the prior art does not allow for emergency disconnection of the low voltage data communication circuitry from fuel dispensers. The lack of emergency shutdown for these low voltage data communication circuits still presents a significant safety hazard in that it has been discovered that low voltage communication circuits can act as an ignition source for volatile gases associated with the delivery of petroleum based fuels such as gasoline.

Moreover, conventional dispenser data distribution systems that provide a dispenser servicing disconnect switch do not provide any way to disconnect all data circuits for a select dispenser with operation of the single switch. The present invention overcomes this problem by providing a disconnector circuit in which the operation of a single selected dispenser control switch can control multiple data circuits for the selected dispenser. While a system for a single dispenser could be constructed, a system with switches and controls for multiple dispensers contained in a single system would be the most desirable.

It can be appreciated that fueling data distribution systems have been in use for years. Typically, fueling data distribution systems are comprised of a dispenser data distribution box used to connect dispenser data wiring to a dispenser site controller.

The main problem with conventional fueling data distribution systems is that they do not provide a disconnector circuit for disconnecting all of the data circuits from power supply sources in response to the operation of the electrical emergency stop system at the site. Furthermore conventional systems do not provide a disconnector circuit for individually disconnecting all of the data circuits for a single dispenser from supply source in response to the operation of a service control switch.

Yet, another problem with conventional fueling data distribution systems is that they do not provide any emergency disconnect circuitry for de-energizing additional data circuits such as intercoms, networking, and video circuits. Still, another problem with conventional fueling data distribution systems is that they do not provide any way of providing individual connection for all data circuits per dispenser. Therefore, additional connections have to be made manually by the installer.

While conventional dispenser data distribution systems may be suitable for the particular purpose to which they address, they are not as suitable for improving on the conventional wiring connecting dispenser data circuits to the site controls. Conventional dispenser data distribution system wiring does not provide any way of controlling dispenser data circuits by an emergency stop system. Additionally, conventional dispenser data distribution system wiring that does provide a dispenser servicing disconnect switch does not provide a disconnect circuit to disconnect all data circuits for a select dispenser with operation of the single switch.

Thus, there remains a need for a new and improved dispenser data distribution system that improves on the conventional wiring that connects dispenser data circuits to the site controls. Moreover, there remains a need for a dispenser data distribution system that includes an emergency stop system for disconnecting supply power sources from the dispenser data circuitry. In other words, the dispenser's data circuits should be de-energized by a single switch emergency stop system.

SUMMARY OF THE INVENTION

The present invention is directed to a new dispenser data distribution system with controllable disconnectors, wherein the same system can be utilized for improving on the conventional dispenser data circuit wiring to the system's site controls.

The general purpose of the present invention, which will be described subsequently in greater detail, is to provide a new dispenser data distribution system with controllable disconnectors that has many of the advantages of the fueling data distribution system mentioned heretofore and many novel features that result in a new dispenser data distribution system with controllable disconnectors which is not anticipated, rendered obvious, suggested, or even implied by any of the prior art fueling data distribution system, either alone or in any combination thereof.

To attain this, the present invention generally comprises an emergency stop control system, emergency stop disconnects, data wiring terminals, a circuit for connecting and grouping data signals, and dispenser data disconnect and bypass circuit. The control voltage is comprised of a signal that indicates the status of the emergency stop system. The disconnects are comprised of relays controlled by emergency stop status control signal. The data wiring terminals are comprised of two-piece terminal blocks arranged to allow the connection of four two-wire communication circuits to each block. The surge suppressor is comprised of a module designed to plug-in to the control board. Each surge suppressor protects eight data line conductors. The dispenser data disconnect and bypass circuit is comprised of circuitry that controls a data circuit when controlled by an individual dispenser control switch. The circuit for connecting and grouping data signals from multiple dispensers is comprised of circuitry that routes these signals to outputs to be connected to other site control interfaces and networks. The additional dispenser control assembly is comprised of an assembly the replicates controls of the system allowing the system control a larger number of dispensers. The additional peripheral control assembly is comprised of an assembly that expands the number of data circuits that can be controlled by a switching control device.

For the purposes of this disclosure, a disconnector is a circuit that electrically isolates one portion of a circuit from another when activated. A disconnector will typically include a relay. Moreover, for the purposes of this disclosure, a relay is a switching device that completes or interrupts a circuit electrically. Relays suitable for the present invention can be either the electromechanical type or of the solid state type having no moving parts.

These and other aspects of the present invention will become apparent to those skilled in the art after a reading of the following description of the preferred embodiment when considered with the drawings.

DESCRIPTION OF THE PREFERRED EMBODIMENTS

Figure 1:
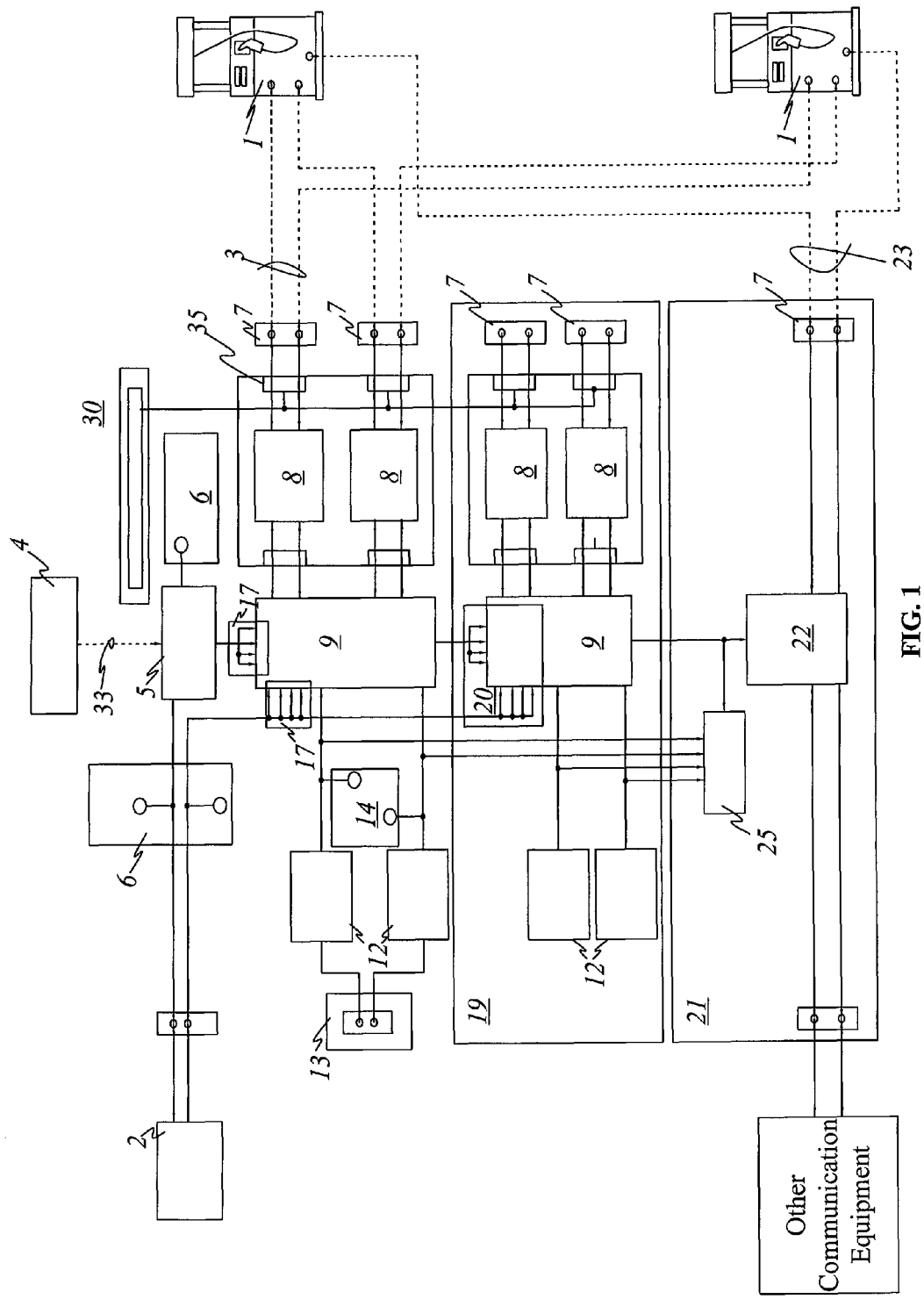
FIG. 1 is a block diagram illustrating a petroleum dispensing system having a dispenser data distribution system with controllable disconnectors constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a petroleum dispensing system is shown diagrammatically according to the present invention.

Turning now descriptively to the drawings, in which similar reference characters denote similar elements throughout the several views, the attached figures illustrate a dispenser data distribution system with controllable disconnectors, which comprises an emergency stop control system, emergency stop disconnects, data wiring terminals, a circuit for connecting and grouping data signals, and dispenser data disconnect and bypass circuit. The control voltage is comprised of a signal that indicates the status of the emergency stop system. The disconnects are comprised of relays controlled by the emergency stop status control signal. The data wiring terminals are comprised of two-piece terminal blocks arranged to allow the connection of four two-wire communication circuits to each block. A surge suppressor comprises a module designed to plug-in to the control board. Each surge suppressor protects eight data line conductors. The dispenser data disconnect and bypass circuit is comprised of circuitry that controls a data circuit when controlled by an individual dispenser control switch. The circuit for connecting and grouping data signals from multiple dispensers is comprised of circuitry that routes these signals to outputs to be connected to other site control interfaces and networks. The additional dispenser control assembly is comprised of an assembly that replicates controls of the system allowing the system to control a larger number of dispensers. The additional peripheral control assembly is comprised of an assembly that allows the expansion of the number of data circuits that can be control by a switching control device.

As shown in FIG. 1, the control voltage is comprised of a signal that indicates the status of the emergency stop system 4. The signal of emergency stop control system 4 is preferably energized during normal operation. During an emergency stop event the signal is not energized. The control voltage preferably is coupled through a transformer in order to step the voltage to a lower level making it more suitable for use with a printed circuit board assembly 26 shown in FIG. 2. Instead of a transformer, the control voltage could be connected direct. The control signal could operate in the reverse where a voltage or signal is present indicates an emergency stop event. The transformer could be of the plug in type that connects to an AC outlet powered from the emergency stop system. The transformer could be of the wired type that can be installed onto an electrical panel or junction box. Alternatively the transformer could be installed as part of the control board assembly or eliminated altogether when using an emergency stop control disconnect and dispenser data disconnect and bypass circuit that are capable of using the higher 120 VAC voltage.

As shown in FIG. 1, disconnects 5 are comprised of relays controlled by the emergency stop status control signal. Disconnects 5 are preferably comprised of two pole relays 31, 37 and 39. These relays are controlled by the emergency stop status control signal path 33. When the emergency stop system is in the normal operational mode the relays are energized, pulling in the contacts completing the circuit. The emergency stop disconnects are used for data communication circuits that need a common disconnect that response to the emergency stop system. In the detailed invention two relays are used. The system disclosed has two separate current loop data communication circuits each controlled by one of the relays. Each circuit serves four dispensers. Each of these circuits require only a single disconnect since individual dispenser disconnect operation is controlled by a separate switch designed to bypass the dispenser connection to the current loop. Based on the number and type of communications circuits that are connected more or less relays could be used. It is also possible that relays with more poles could be used to replace multiple other relays. Data circuits other then current loop data circuits can be controlled by a relay or relays connected in the same manner. These relays would allow for common control by the emergency stop system and not by an individual dispenser control switch.

Figure 3:
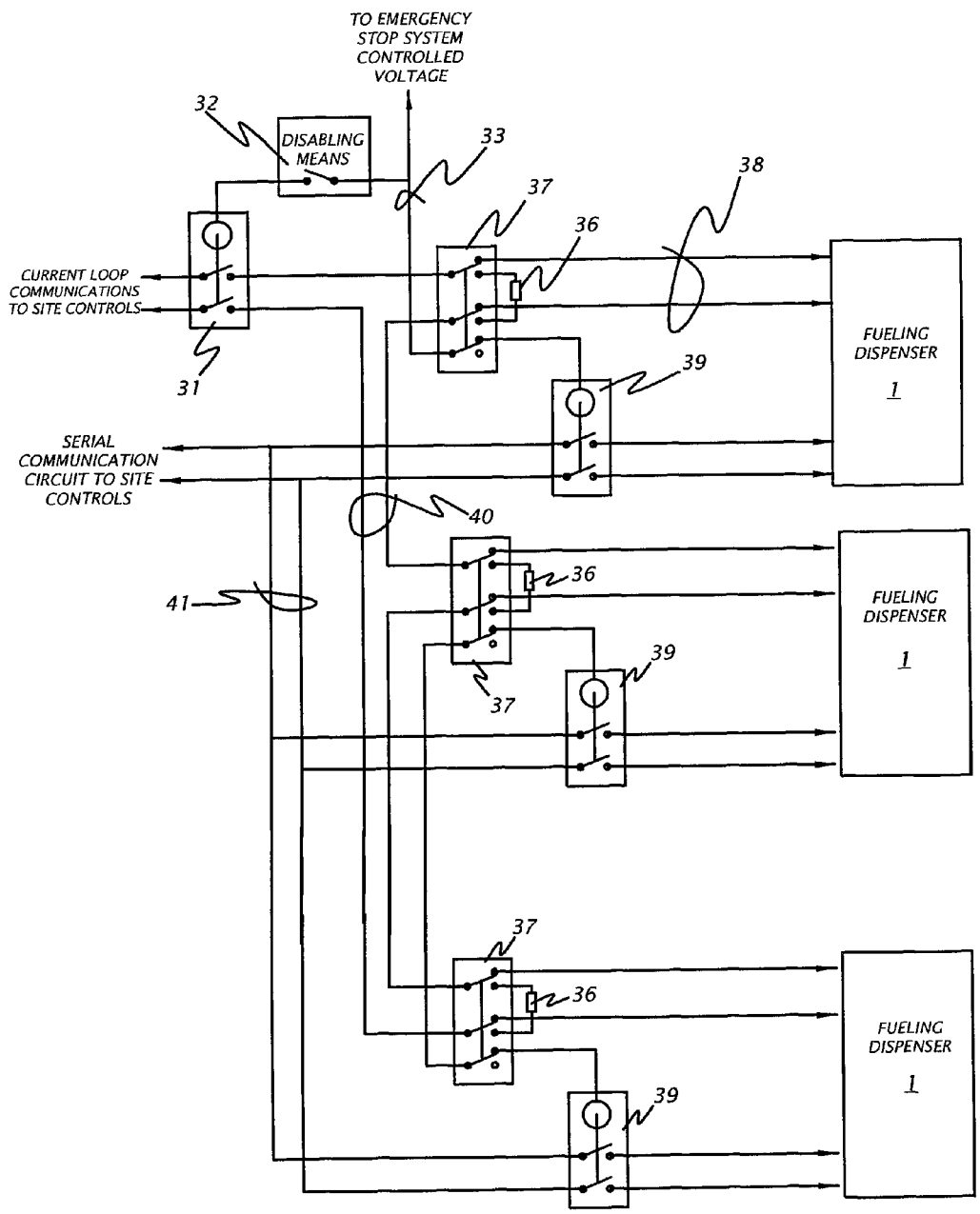
FIG. 3 is a block diagram illustrating the circuit operation of the dispenser data distribution system with controllable disconnectors.

In addition to the responding to the emergency stop status control signal the relays could also be controlled by a signal from another control system. Also shown in FIG. 3, a variation of the controls would connect a disabling device or switch 32 in series with the control coil of the relay. Another variation would allow for status indicators such as LEDs 6 to be connected to the control signals and or the data circuit signals to indicate presence of a signal. The relay could be connected to switch a single conductor of a two-wire data circuit in order to disconnect the circuit. Additional circuitry could be used separately or used with the emergency stop control system status control signal to control the relays.

The data wiring terminals are comprised of two-piece terminal blocks arranged to allow the connection of four two-wire communication circuits to each block. As shown in FIG. 1, the data wiring terminal blocks 7 are preferably comprised of an eight position, two-piece terminal block for each group of four data circuits. Since the system disclosed is designed to connect to up to eight dispensers 1 each with two data circuits, the blocks were divided into two groups. Each group consists of two sets of blocks selected to allow the connection of a two-wire data circuit from four dispensers. Instead of two-piece terminal blocks other types of terminal connections could be used. The terminals can be grouped in various combinations based on the quantity of dispensers and the associated number of data circuits for each dispenser.

Figure 4:
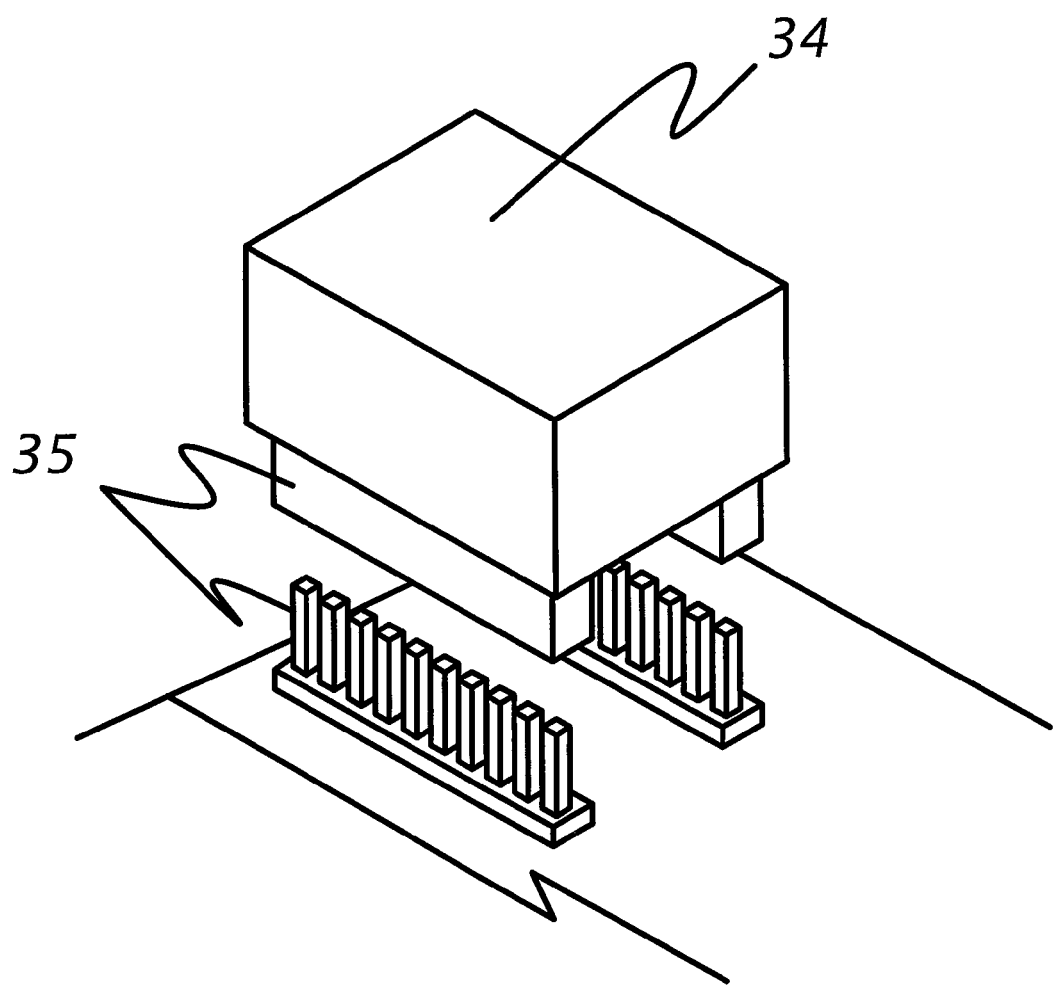
FIG. 4 illustrates the surge suppressor module installation for the dispenser data distribution system with controllable disconnectors.

As shown in FIG. 1, a surge suppressor 8 is comprised of a module designed to plug-in to the control board. Each surge suppressor protects eight data line conductors. The data surge suppressors 8 as disclosed are designed to connect in series of the data circuits from the dispensers. As shown in FIG. 4, the surge suppressors in the disclosed design uses surge suppression modules 34. Each module is designed to protect up to eight data wires, which represents four data circuits. The surge suppressor provides circuitry consisting of terminal PTC protectors and Zener type surge protection diodes that clamps data signals voltage in reference to ground. Different surge modules are designed for use on different data circuit voltages based on the clamping voltage of the Zener diodes.

Moreover, as shown in FIG. 4, the modules plug into the control printed circuit board via ten position connectors 35. The connectors provide positions for either the input or output connection of the eight data circuit wires and two common ground connections. A separate connector is used for input and output of the surge suppressor. Instead of the surge suppression being constructed in a separate module that can be detached from the control printed circuit board, the surge suppression circuitry could be constructed as part of the control printed circuit board. Instead of being a series connected suppression circuitry design a parallel suppression circuit design could be used.

If the parallel surge suppression is to be used as a plug on module than only a single input connector would be requires. When constructed as a module the module can be designed to protect any number of data circuits. When constructed as a module other connectors designs can be used.

The dispenser data disconnect and bypass circuit is comprised of circuitry that controls a data circuit when controlled by an individual dispenser control switch. The dispenser data disconnect and bypass circuit is preferably comprised of a resistor 36 connected to two poles 37 of the switching circuit 12, in the case of the disclosed design a multiple pole switch is used for each individual dispenser 1. When the individual dispenser control switch is selected the resistor is switched in place of the fuel dispenser circuit 38 while disconnecting the dispenser circuit.

While this circuitry is acceptable for a current loop data circuit additional circuitry is required for disconnecting other circuits associated with a dispenser. In order to disconnect additional circuits, one pole of the individual dispenser control switch is used to control an individual dispenser data control relay 39. By connecting the emergency stop status signal through the one pole of the individual dispenser control switch the relay 39 is then controlled by both the emergency stop shut down and the individual dispenser control switch.

Instead of using a multiple pole switch 37 a relay could be used in its place controlled by a single or multiple pole individual dispenser control. In place of the individual dispenser data control, multiple single of multiple pole relays could be used. Based on the types and number of dispenser data circuits that are to be controlled various combinations of resistor bypass and relay disconnect circuits could be constructed.

Optionally the individual dispenser control signal could come from a remote source. Optional status indicators 14 could be provided.

The circuitry for connecting and grouping data signals from multiple dispensers is comprised of circuitry that routes these signals to outputs to be connected to other site control interfaces and networks. The circuitry for connecting and grouping data signals is preferably comprised of circuitry that allows similar data circuits from multiple dispensers to be connected together 17 for the purpose of communicating to site controller or network 2.

In the use of current loop communications with dispensers the circuitry connects the individual bypass switching circuit in series with multiple dispensers 1. A control signal bus 40 communicates with dispensers 1 though relays 37. In the case of serial communications the data circuits are connected in parallel using a parallel bus 41. Data circuits from multiple dispensers can be grouped into more than one group.

The additional dispenser control assembly is comprised of an assembly that replicates controls of the system, thereby allowing the system to control a larger number of dispensers. The additional dispenser control assembly 19 is preferably comprised of a printed circuit board assembly much like the primary control printed circuit assembly 26. The additional assembly would be installed onto the back panel 27 and connected to the primary control assembly with a ribbon cable assembly that includes control signals 20 that allow the additional assembly to expand the dispenser capability of the primary control assembly communication channels.

Instead of the additional control assembly being connected to expand the communication groups or channels of the primary board, the control assembly could be connected to allow the additional control assembly to expand the number of dispensers and the number of control channels. The additional control assembly can include surge suppression on the data communication lines.

The additional peripheral control assembly is comprised of an assembly that allows expansion of the number of data circuits that can be controlled by a switching control device. The additional peripheral control assembly 21 is preferably comprised of a printed circuit board assembly. It contains disconnecting circuit, which are typically relays 22 for communication circuits. The disconnecting circuit is controlled by control signals from the switching control devices 12 and the emergency stop control system 4.

For controlling an additional communication circuit for a single dispenser a control relay is connected to control that data circuit. The dispenser control relay is controlled by the corresponding switching control device 12. A control signal selector 25 circuit can be added to allow a single control relay to respond to the status of multiple switching control devices. Instead of the additional peripheral control assembly installed in the primary system enclosure it can be constructed in such a manner that it can be installed remote of the primary system.

A step-down transformer is connected to the emergency stop system allowing a 120 VAC circuit to be stepped down to a lower voltage such as 24 VAC. This control voltage is then wired to the control board assembly using a screw type terminal block. This voltage is then connected to operate the emergency stop disconnect circuit and the dispenser data disconnect and bypass circuit.

The emergency stop disconnect relays are connected to the emergency stop status control signal from the emergency stop system. The control relay controls the current loop data circuit connected to the switching contacts of the relay. Each conductor of the two-wire data circuit connects to a separate set of contacts of the relay. The terminal blocks allow connection of the dispenser wiring to the circuit board. By using a two-piece terminal block allows the block to be separated to facilitate wiring of the terminals before plugging them into the board. The two-piece connectors also simplifies replace a board that may be damaged.

The surge suppression modules connect in series with the dispenser data wiring by using connectors installed on the modules a and mating connector used on the control system printed circuit board. The connectors make connection for the input and outputs of eight data conductors. The individual dispenser data disconnect switching device is a switch connected to the resistor for bypassing and connected to dispenser data control relays for disconnecting. The dispenser data signals from the dispenser data disconnect and bypass circuit is connected in either series or parallel via the circuitry on the printed circuit board assembly. These signals then connect to remote dispenser site or network interfaces via various connection circuits.

The additional control assembly is connected to the primary control assembly's emergency stop disconnect control signal in order to allow the additional control assembly to respond to the emergency stop system. The data circuits from the dispensers are connected in either parallel or series with the dispenser data circuits of the primary control assembly as required. The additional peripheral control assembly is connected to the primary control assembly's emergency stop disconnect control signal in order to allow the additional peripheral control assembly to respond to the emergency stop system.

The control voltage transformer could be of the plug in type that connects to an AC outlet powered from the emergency stop system. The control voltage transformer could be of the wired type can be installed onto an electrical panel of junction box. Alternatively, the control voltage transformer could be installed as part of the control board assembly or eliminated altogether when using an emergency stop control disconnect and dispenser data disconnect and bypass circuit that are capable of using the higher 120 VAC voltage.

The emergency stop disconnect relay could be connected to switch a single conductor of a two-wire data circuit in order to disconnect the circuit. Additional circuitry for controlling the emergency stop disconnect could be used separately or used in conjunction with the emergency stop control system status control signal to control the relays.

While the two-piece data wiring terminal may be preferred, it is possible to use a single piece data wiring terminal or a connector of a different type. The arrangement of the data wire connections to the terminals may be grouped by dispenser, function, type or wire size.

The data surge suppression modules are optional to the invention. The data surge suppression could be constructed either on the printed circuit board or in a different module design. In the disclosed design the data surge suppression circuitry is connected in series. Other suppression circuit types could be used.

Additional switching circuitry other that a switch could be for initiating the individual dispenser bypassing and disconnecting circuitry. The bypassing circuit could be constructed with a shorting jumper in place of a resistor. The bypassing resistor and data control relays can be any combination of switches and or relays. The circuitry required for the circuit for connecting and grouping data signal could be constructed using other wiring than printed circuit wiring. The additional dispenser control assemblies could be housed in a separate enclosure while connecting to the primary system. The additional peripheral control assemblies could be housed is a separate enclosure while connecting to the primary system.

Various circuits for handling the communication circuits can be implemented in order to reduce communication circuit wiring.

In most typical fuel dispenser 1 installations, the dispensers communicate to a site controller or an interface to the point of sales system 2. This communication is sent over data communication lines 3. In most typical installations there are two communication circuits for each dispenser. One is used for communication of dispenser data and the other is for credit card data and processing. The most common types of communication are current loop transmission and serial data communications.

Typical dispensers use either a combination of two current loop circuits or a current loop and s serial data communication circuit. In this disclosure an installation of two dispensers using a current loop and a serial data communication circuit is illustrated. It is my intention that the circuits shown could be expanded as needed for multiple dispensers using any combination of communication circuits.

The problem is that a safety concerns arises when a service person works on an individual dispenser. During the servicing of a dispenser the service person will disconnect ac power from a dispenser. While the AC power is disconnected the threat of an arc from the electrical circuits and wiring creating an ignition source is eliminated. However a threat still exists from the electrical energy available through the data wiring.

The NFPA 70 (National Fire Protection Association, "National Electrical Code") and NFPA 30A ("Automotive and Marine Service Station Code") requires all wiring to a dispenser to be disconnected from all voltage sources including AC power and data communication circuits in the case of emergency or servicing a dispenser. While most sites are equipped with emergency stop systems 4 for disconnecting AC power during in case of an emergency these system do not address disconnecting the data circuits, wiring and communications equipment from the dispenser.

While current technology provides circuitry for disconnecting a single communication circuit from a dispenser for servicing, it does not allow operation in response to the emergency stop system nor does it allow the disconnect of multiple communication circuits that connect to a single dispenser. In my present inventions the control system is connected to a control voltage derived from the emergency stop system 4. This voltage is used to control emergency stop disconnects 5. Optionally, a status indicator 6 may be provided to indicate the presence of the control voltage, status of the emergency stop disconnects or status of the data communication circuits.

Data communication circuit 3 wiring from the dispensers is connected to terminal blocks 7. The terminal blocks are arranged by data circuit type but could be arranged by the circuits for a particular dispenser. In the example a single set of terminals is provided for each data communication type, but based on the number of dispenser and channels or groups dispenser other arrangements of multiple terminals could be provided. The data circuits are then connected through communication data circuit surge suppressor modules 8. These modules are optional but may be included to enhance the integrity of the data circuits. The data communication circuits are then connected dispenser data disconnect and bypass circuit 9.

In the illustrated example a current loop dispenser data circuit and a serial communication data circuit is illustrate for the purpose of showing how each can be controlled. Based on the types of dispenser data communication circuits and the number of dispenser other combinations of these circuits may be provided for as part of the system. When servicing or needing to disconnect the data circuits and wiring for a single dispenser an individual dispenser control switching device 12 is operated.

Optionally, the control switching device could be or also be a remote input 13 from another system. Optionally, status indicators 14 could be provided to indicate the selected status of the switching device.

When the switching device is operated in the example for the current loop dispenser data communication circuits are bypassed by using a resistive or shunt element 15 in order to maintain the operation of the current loop and to allow the disconnect from the dispenser. When the switching device is operated in the example for the serial communication data circuit a relay 16 is controlled, disconnecting the serial data wiring. As the control circuits are constructed and wired the dispenser data communication circuits are then electrical combined in either series or parallel orientation 17.

Based on the number of dispenser and requirements of the site, the communication circuits may be combined in one or more circuits. As required each group or channel of dispenser data communication circuits are connected as a group through the emergency stop control disconnect 5. In the illustrated example the emergency stop control disconnect is a relay 18 controlled by the emergency stop control voltage.

A variation where the control of the dispenser serial data communication circuits 11 already using a relay per dispenser controlled by the emergency stop control voltage for individual dispenser communication circuit disconnect can be used for the emergency stop control disconnect. As part of the system additional control assemblies 19 can be added to accommodate more dispensers and associated dispenser communication circuits. The additional control assembly would interface to the first board's communication circuits 20. The additional control assembly would also interface to the emergency stop systems control voltage.

A variation would be to supply a redundant control assembly that would maintain separate dispenser data communication circuits. The second assembly may respond to the same emergency stop system. As part of the system additional control assemblies 21 could be connected to the first and or second control assembly in order to provide disconnect circuit for other data communication circuits 22 that connect to a dispenser 23.

The disconnect circuits respond to the control signals 24. These controls signals are in response to the individual circuit disconnects and the emergency stop control status. The disconnecting mean 24 may respond to any combination of these signals as selected by the optional control signal selection 25. The system illustrated is assembled onto a printed circuit board 19. This assembly is designed for up to eight dispensers with both current loop communications and serial data communications.

The assembly as illustrated has the individual dispenser control switches 12 mounted on to a second printed circuit board that is mounted atop the first circuit board. Assembly variations could include assembly of circuits onto a single printed circuit board, assembly by wiring discrete components or a combination of both printed circuit board wiring and discrete wiring.

Figure 2:
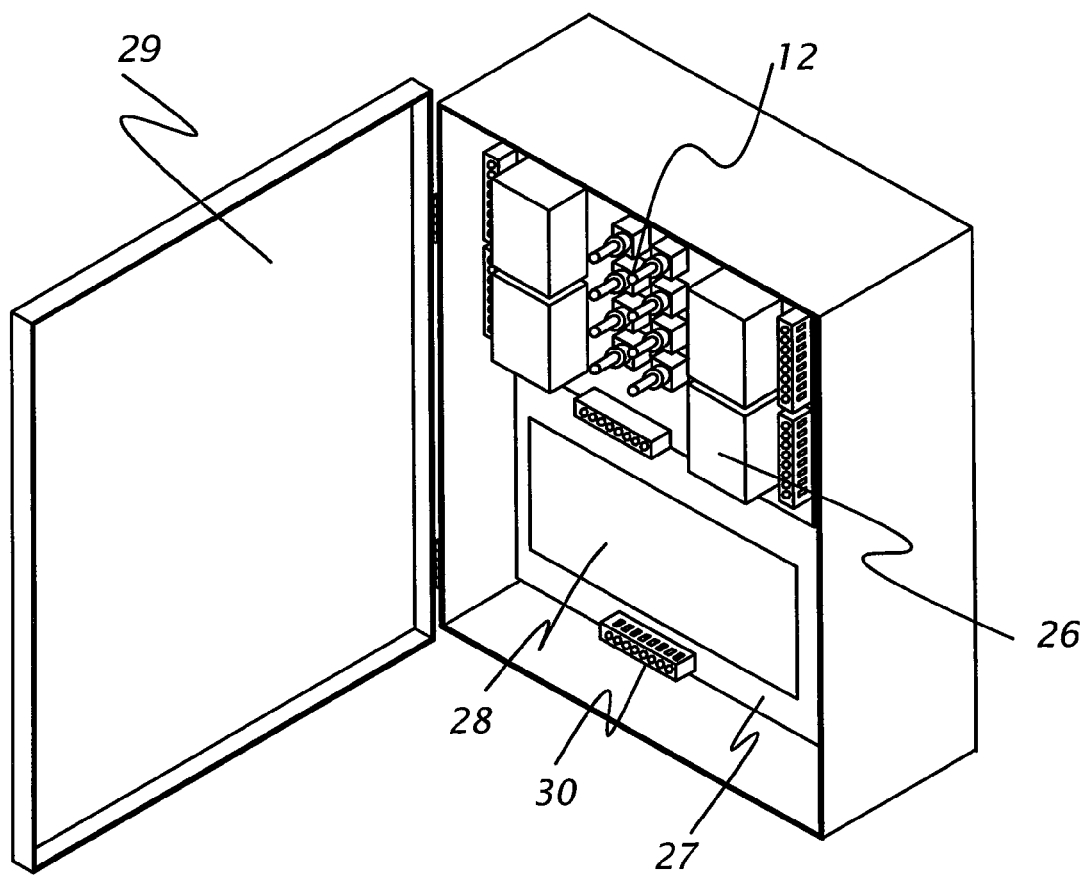
FIG. 2 is a perspective view of the dispenser data distribution system with controllable disconnectors in a conventional electrical cabinet.

As best seen in FIG. 2, printed circuit board 19 is mounted to a panel 27. Panel 27 is used to allow printed circuit board 19 to be mounted into an existing enclosure design. Optionally provisions for installing additional control assembly boards 28 could be provided.

As also shown in FIG. 2, an enclosure 29 can be constructed as part of the system or the control circuit boards can be supplied on the panel for retrofit existing enclosure already mounted in the field. Other variations may include printed circuit board of other dimensions and other mounting hardware with or without a panel. Optionally a grounding terminal 30 may be provided to facilitate termination of the grounding conductors that are part of the dispenser data communication circuit wiring.

Certain modifications and improvements will occur to those skilled in the art upon a reading of the foregoing description. By way of example, the emergency stop system for the dispenser data distribution system could include a wireless link made up of radio frequency transmitters and receivers. It should be understood that all such modifications and improvements have been deleted herein for the sake of conciseness and readability but are properly within the scope of the following claims.

I claim:

1. A petroleum dispensing system comprising:
   (a) at least one dispenser;
   (b) a site controller connected to said at least one dispenser to provide a low voltage dispenser serial data circuit located between each of said at least one dispenser and said site controller; and
   (c) a controllable disconnector connected between each of said at least one dispenser and a dispenser data distribution system, whereby said controllable disconnector is adapted to de-energize each individual low voltage dispenser serial data circuit between each of said at least one dispenser and said site controller.

2. The system according to claim 1, further including an additional emergency stop disconnector.

3. The system according to claim 2, wherein said additional emergency stop disconnector includes at least one relay.

4. The system according to claim 3, further including a service control interrupt wherein said at least one relay is connected to said service control interrupt for controlling said at least one relay.

5. The system according to claim 1, wherein said dispenser data distribution system includes a dispenser wiring terminal block, a switching device, and a site controller interface.

6. The system according to claim 5, wherein said switching device is a relay.

7. The system according to claim 5, further including at least one data surge suppression module.

8. The system according to claim 5, further including at least one status indicator.

9. A dispenser data distribution system for a petroleum dispensing system having at least one dispenser and a site controller connected to said at least one dispenser to provide a low voltage dispenser serial data circuit located between each of said at least one dispenser and said site controller, said dispenser data distribution system comprising:
   (a) a controllable disconnector connected between each of said at least one dispenser and said site controller;
   (b) a control input connected to said controllable disconnector, whereby said controllable disconnector is adapted to de-energize each individual low voltage dispenser serial data circuit between each of said at least one dispenser and said site controller in response to said control input; and
   (c) an emergency stop control voltage interface.

10. The system according to claim 9, wherein said controllable disconnector includes at least one relay connected to the dispenser data circuit.

11. The system according to claim 9, wherein said control input is selected from the group consisting of a data disconnector selector and a remote input from another system or combinations thereof.

12. The system according to claim 11, wherein said data disconnector selector is a switch.

13. The system according to claim 12, wherein said switch includes a data disconnector.

14. The system according to claim 13, further including a shunt for bypassing a current loop formed by the connection between said site controller and said at least one dispenser.

15. The system according to claim 9, wherein the emergency stop control interface controls all disconnectors.

16. A petroleum dispensing system comprising:
(a) at least one dispenser;
(b) a site controller connected to said at least one dispenser to provide a low voltage dispenser serial data circuit located between each of said at least one dispenser and said site controller;
(c) a controllable disconnector connected between each of said least one dispenser and said site controller and a control input connected to said controllable disconnector, whereby said controllable disconnector is adapted to de-energize each individual low voltage dispenser serial data circuit between each of said at least one dispenser and said site controller in response to said control input; and
(d) an additional emergency stop disconnector.

17. The system according to claim 16, wherein said additional emergency stop disconnector includes at least one relay.

18. The system according to claim 17, further including a service control interrupt wherein said at least one relay is connected to said service control interrupt for controlling said at least one relay.

19. The system according to claim 16, wherein said dispenser data distribution system includes a dispenser wiring terminal block, a switching device, and a site controller interface.

20. The system according to claim 19, wherein said switching device is a relay.

21. The system according to claim 19, further including at least one data surge suppression module.

22. The system according to claim 19, further including at least one status indicator.

23. The system according to claim 16, wherein said controllable disconnector includes at least one relay connected to the dispenser data circuit.

24. The system according to claim 16, wherein said control input is selected from the group consisting of a data disconnector selector and a remote input from another system or combinations thereof.

25. The system according to claim 24, wherein said data disconnector selector is a switch.

26. The system according to claim 25, wherein said switch includes a data disconnector.

27. The system according to claim 26, further including a shunt for bypassing a current loop formed by the connection between said site controller and said at least one dispenser.

28. The system according to claim 16, further including an emergency stop control voltage interface.

29. The system according to claim 28, wherein the emergency stop control interface controls all disconnectors.

* * * * *

UNITED STATES PATENT AND TRADEMARK OFFICE
CERTIFICATE OF CORRECTION

| | | |
|---|---|---|
| PATENT NO. | : 8,030,803 B1 | Page 1 of 1 |
| APPLICATION NO. | : 11/866716 | |
| DATED | : October 4, 2011 | |
| INVENTOR(S) | : Ford | |

It is certified that error appears in the above-identified patent and that said Letters Patent is hereby corrected as shown below:

In Column 4, Line 6, the word control should be "controlled"

In Column 4, Line 10, the word two should be replaced with the word "three"

In Column 5, Line 38, the word requires should be "required"

In Column 7, Line 4, the word replace should be "replacing"

In Column 7, Line 8, after module, delete the word "a"

In Column 7, Line 64, the word is should be "in"

In Column 7, Line 66, the word is should be "In"

In Column 8, Line 14, delete the "s" before the word serial

In Column 8, Line 23, ac should be "AC"

In Column 8, Line 63, illustrate should be "illustrated"

Signed and Sealed this
Twenty-ninth Day of November, 2011

David J. Kappos
*Director of the United States Patent and Trademark Office*